United States Patent
Finley et al.

(10) Patent No.: US 9,576,324 B2
(45) Date of Patent: Feb. 21, 2017

(54) PENALTY AND INTEREST ASSESSMENT DETAIL DISPLAY

(71) Applicant: ORACLE INTERNATIONAL CORPORATION, Redwood Shores, CA (US)

(72) Inventors: Richard Finley, Cary, NC (US); Colleen Balkan, Madison, CT (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 138 days.

(21) Appl. No.: 13/753,922

(22) Filed: Jan. 30, 2013

(65) Prior Publication Data

US 2013/0226748 A1    Aug. 29, 2013

Related U.S. Application Data

(60) Provisional application No. 61/603,416, filed on Feb. 27, 2012.

(51) Int. Cl.
G07B 17/00  (2006.01)
G07F 19/00  (2006.01)
G06Q 40/00  (2012.01)

(52) U.S. Cl.
CPC .................... *G06Q 40/10* (2013.01)

(58) Field of Classification Search
None
See application file for complete search history.

(56) References Cited

U.S. PATENT DOCUMENTS

| | | | |
|---|---|---|---|
| 6,192,347 B1* | 2/2001 | Graff | 705/36 R |
| 6,898,573 B1* | 5/2005 | Piehl | 705/31 |
| 7,107,239 B2* | 9/2006 | Graff | 705/36 R |
| 2001/0044734 A1* | 11/2001 | Walker et al. | 705/4 |
| 2002/0046144 A1* | 4/2002 | Graff | 705/36 |

* cited by examiner

*Primary Examiner* — Fateh M Obaid
(74) *Attorney, Agent, or Firm* — Kraguljac Law Group, LLC

(57) ABSTRACT

Systems and methods are provided for displaying tax penalty and interest assessment calculation details on demand, in real time. In some embodiments, a method includes receiving a request for a penalty and interest assessment value and determining if the request includes a request for calculation details. When the request includes a request for calculation details, the penalty and interest assessment value is calculated using data received with the request. One or more calculation details are populated based on the calculation of the penalty and interest assessment. The method includes displaying the calculated penalty and interest assessment value and the calculation details.

16 Claims, 5 Drawing Sheets

PENALTY AND INTEREST ASSESSMENT DETAIL DISPLAY

CROSS REFERENCE TO RELATED APPLICATIONS

This patent disclosure claims the benefit of U.S. Provisional Application Ser. No. 61/603,416 filed on Feb. 27, 2012, which is incorporated herein by reference.

BACKGROUND

Tax Authorities are responsible for managing revenue and administering tax law and policy. This generally includes the authority to assess penalties and interest against taxpayers or citizens who are not compliant with the tax law. The most common assessments are late payment penalties, simple or compound interest on past due debt, and failure to file penalties. The tax law and department policy will prescribe how credits and payments are allocated against tax and other types of debts, as well as the calculation basis for assessing penalty and interest. The calculations are quite complex, especially in scenarios where there are partial payments, and the penalty and interest accrues daily or monthly.

Penalty and interest assessments of unpaid taxes can be significant financial amounts. For the integrity of the tax authority and legal system, it is important that these assessments be accurate. It is common for taxpayers to question how tax penalty and interest have been calculated and assessed, especially in complex scenarios. Historically, tax authorities have struggled with how to explain and verify the correct application of tax law and policy for a penalty and interest assessment. Processing systems typically provide the dollar amounts for penalty and interest calculated, but do not provide the details needed to verify that the calculation is correct, that tax law and policy has been correctly applied, and to sufficiently explain to a taxpayer how the amount of the assessment was determined.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The systems and methods described herein provide a detailed view of penalty and interest assessments for display to a user. This provides the tax authority with a date based, step by step, detailed view of how penalty and interest were calculated. The view takes each penalty type for each applicable date range, and provides the rates, calculation basis, and assessment amounts that were used in each calculation step. This allows a tax authority to quickly and easily verify that penalty and interest are accurately calculated, explain the calculations to taxpayers, judges, or other stakeholders, and prove that tax law and policy was properly administered.

Figure 1:
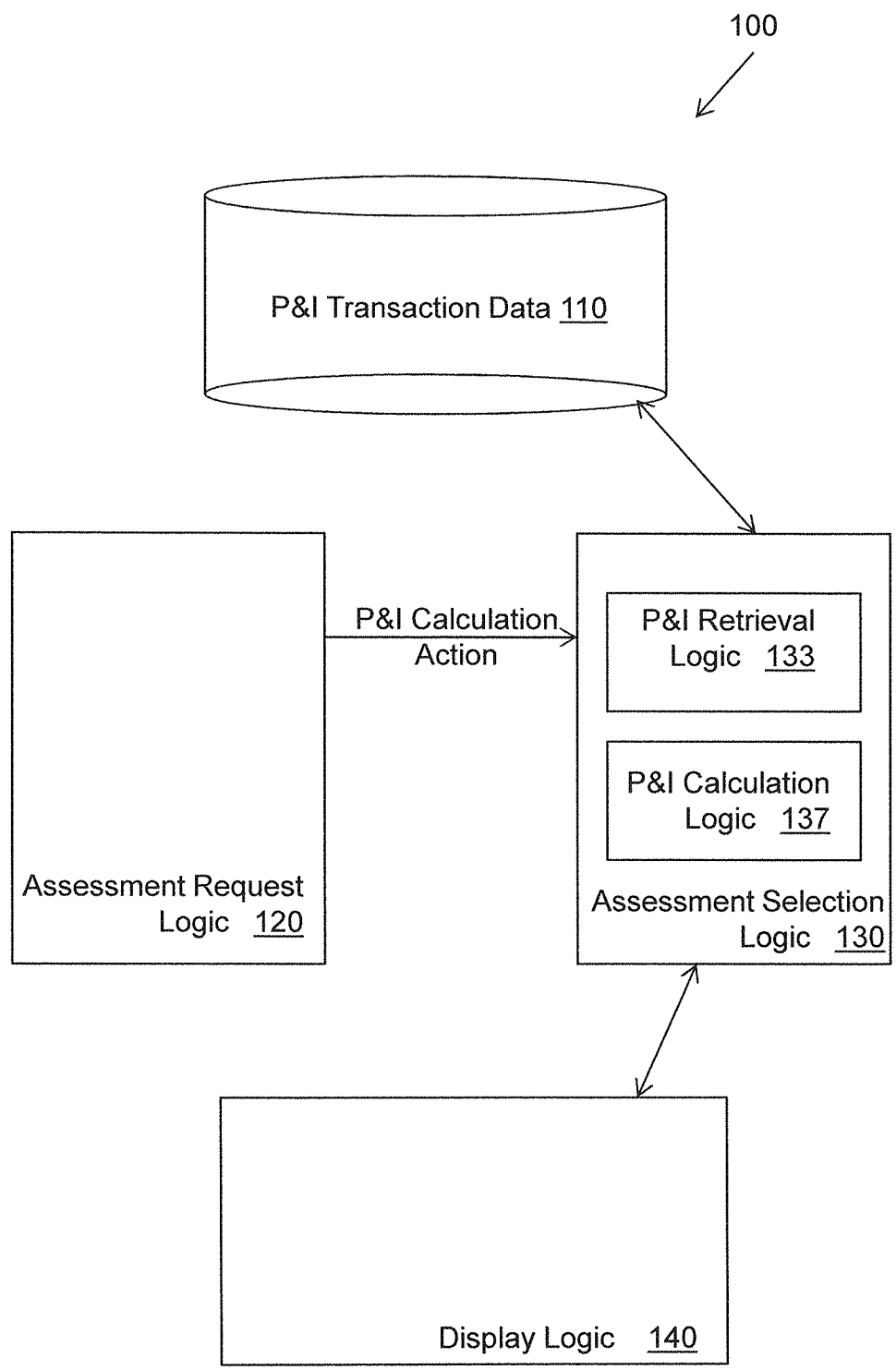
FIG. 1 illustrates one embodiment of a system associated with penalty and interest assessment detail display.

With reference to FIG. 1, one embodiment of a system 100 associated with penalty and interest assessment detail display is illustrated. The system 100 includes a penalty and interest transaction data store 110 configured to store penalty and interest transaction data, including penalty and interest assessment values. Penalty and interest assessment values are stored on the basis of obligations, which identify a particular taxpayer and tax obligation that incurred the penalty and interest.

The system includes an assessment request logic 120 configured to receive a request for a penalty and interests assessment value and determine a calculation action associated with the request. For the purposes of this description, "penalty and interest assessment value" includes assessment values for either penalties, interest, or both penalties and interest. The system 100 includes an assessment selection logic 130 configured to receive the calculation action determined by the assessment request logic 120. The calculation action may or may not include a request for calculation details. The assessment selection logic 130 includes a penalty and interest retrieval logic 133 configured to retrieve a stored penalty and interest assessment value from the penalty and interest transaction data store 110 when the calculation action does not include a request for calculation details.

The assessment selection logic 130 includes a penalty and interest calculation logic 137 configured to calculate a penalty and interest assessment value using data received as part of the request when the calculation action includes a request for calculation details. The penalty and interest calculation logic 137 is configured to populate one or more calculation details when the calculation action corresponds to a request for calculation details. The calculation details are determined by the penalty and interest calculation logic 137 using the same techniques that produced the stored penalty and interest assessment values, rather than retrieving a stored penalty and interest assessment value from the penalty and interest transaction data store 110. The system 100 includes a display logic 140 configured to display the retrieved penalty and interest assessment calculation or the calculated penalty and interest assessment and the calculation details.

In one embodiment, the penalty and interest calculation logic 137 is a plug-in that is configured to populate selected calculation details that support individual penalty and interest calculations. A penalty and interest details data area of the plug-in provides for one or more calculation details to be populated. One input parameter for the plug-in is the calculation action and one value for the calculation action is the request for calculation details. The penalty and interest calculation logic 137 is responsible for populating the calculation details as appropriate based on stored calculation algorithms. To produce the calculation details for a penalty and interest assessment value, the penalty and interest calculation logic 137 uses algorithms that produce the penalty and interest assessment values stored in the penalty and interest transaction data store 110. Example algorithms include the monthly calculation and the rate factor penalty calculation.

In one embodiment, the calculation details are provided when a calculation penalty and interest routine is called in a detailed forecast mode. In the detailed forecast mode, a forecast of the penalty and interest assessment is calculated in real time based on an input date. Thus, a penalty and interest assessment value can be forecast for any past, present, or future date in this mode. To save storage space, the calculation details for the future date's penalty and interest assessment value may not be stored with the penalty and interest assessment values in the P&I transaction data store 110. Rather the forecast penalty and interest assessment values and calculation details are generated for display purposes and then discarded.

Figure 3:
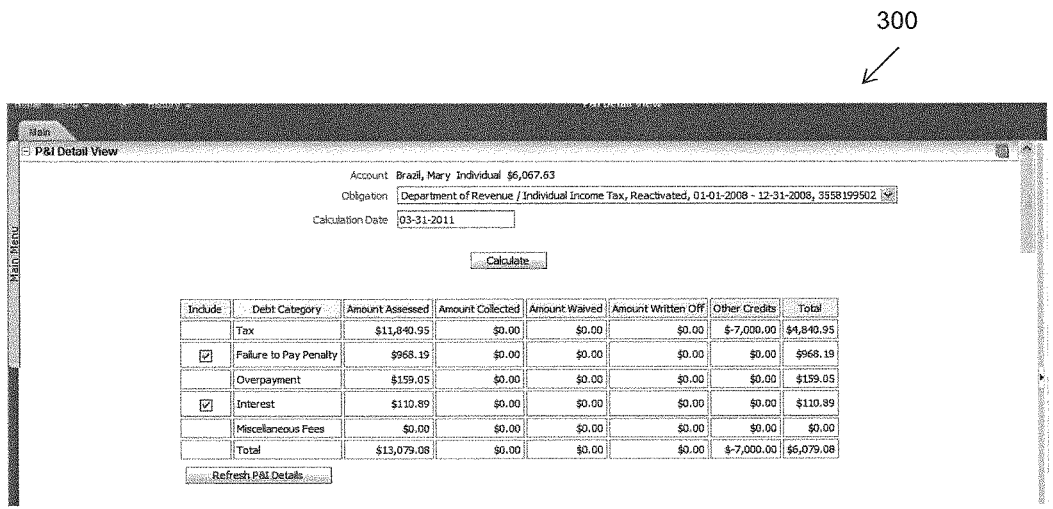
FIG. 3 illustrates one embodiment of a user display associated with penalty and interest assessment detail display.

A new portal is provided to view the penalty and interest details for a given obligation. A penalty and interest summary screen 300 that provides the penalty and interest values is shown in FIG. 3. Once an obligation and a date are input, the penalty and interest calculation logic 137 can be called in detailed forecast mode and the details can be displayed to a user in tree format such as the detail screen 400 shown in FIG. 4.

To ensure that the extra work of populating the calculation details is not done for every request to forecast penalty and interest (when some requests do not require the extra detail), an input parameter, "penalty and interest calculation action," may be introduced to a penalty and interest calculation plug-in in the following spots: penalty and interest calculation, retrieve details, and penalty and interest rule processing. The penalty and interest calculation action can have the following values: penalty and interest calculate/update, penalty and interest standard forecast, and penalty and interest detailed forecast. Calculation details are provided only when the penalty and interest detailed forecast is selected.

The penalty and interest retrieval logic 133 does not retrieve the existing penalty and interest transactions when the penalty and interest calculation action is set to detailed forecast. This forces the penalty and interest calculation logic 137 to build the penalty and interest transactions from the beginning and populate the calculation detail information accordingly. Without this feature, the output of the detailed forecast may not produce desired results if the penalty and interest calculation logic 137 is configured to produce "delta" transactions. Framework is provided to allow dynamic extension of data areas. This means that is possible to extend base data areas when additional data is needed, avoiding the need to provide a new data area name.

Figure 2:
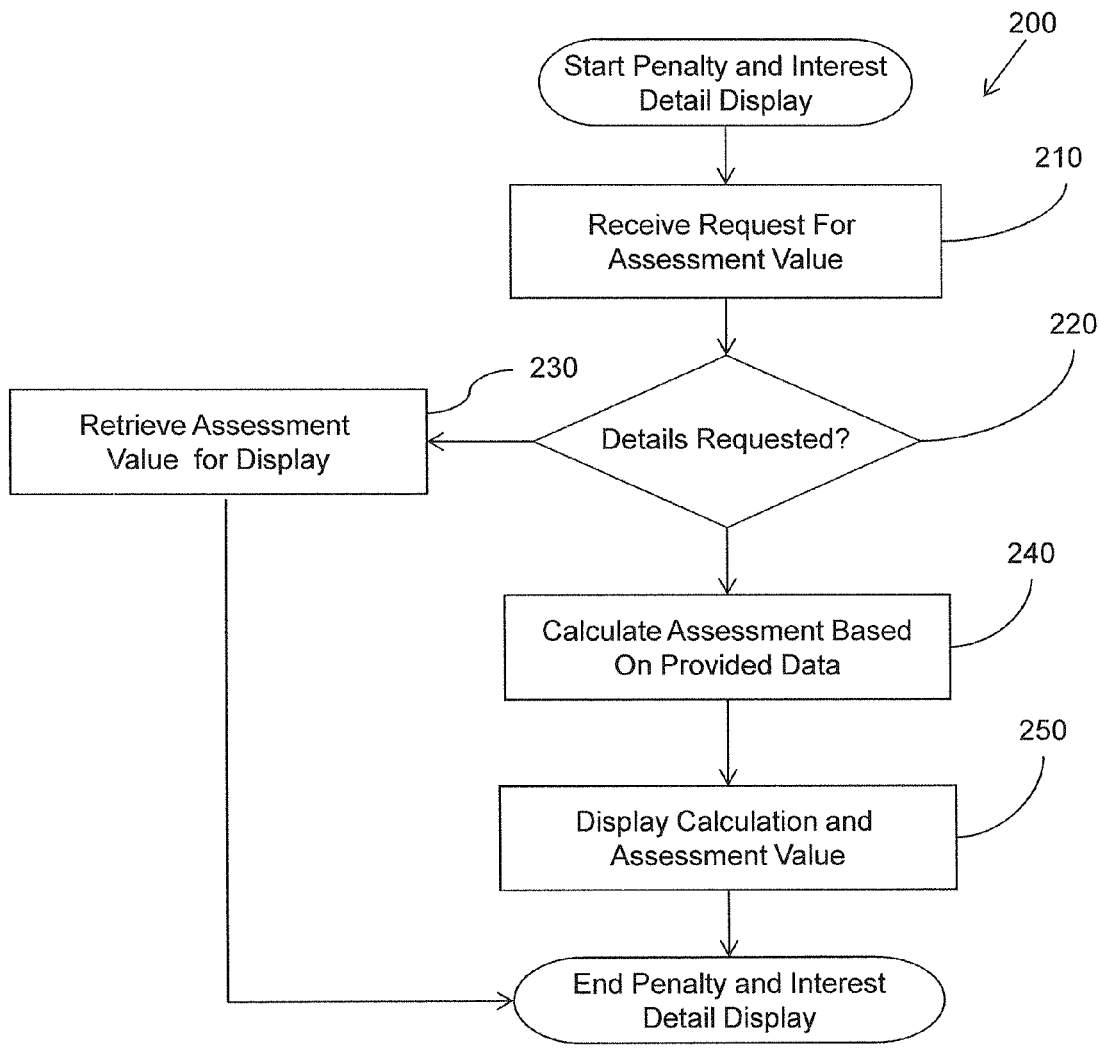
FIG. 2 illustrates one embodiment of a method associated with penalty and interest assessment detail display.

FIG. 2 illustrates one embodiment of a method 200 for providing penalty and interest assessment details for display. The method includes, at 210, receiving a request for a penalty and interest assessment value. At 220 the method includes determining if the request includes a request for calculation details. A request for calculation details may be made by selecting a penalty and interest detailed forecast mode. The penalty and interest detailed forecast selection may be an input to a plug-in that calculates and displays penalty and interest assessment values as well as calculation details. At 230 the method includes retrieving a stored penalty and interest assessment value and displaying the retrieved penalty and interest assessment value when the request does not include a request for calculation details. A request for a penalty and interest assessment value without calculation details may be made by an input selection to the plug-in that specifies a penalty and interest standard forecast mode.

At 240 when the request includes a request for calculation details, the method includes calculating the penalty and interest assessment value using data (e.g., date for assessment calculation) received with the request at 240. One or more calculation details are populated based on the calculation of the penalty and interest assessment for the input date. The calculation and population of calculation details may be performed by a plug-in. At 250, the method includes displaying the calculated penalty and interest assessment value and the calculation details.

FIG. 3 illustrates one embodiment of a penalty and interest window 300. When details of a penalty and interest assessment value are desired, an account and obligation are input. A calculation date is input that is passed to the penalty and interest calculation logic 137 (FIG. 1). Initially a grid showing the obligation's balance details for the forecasted date is displayed, with a row for each unique debt category for the charges associated with the obligation. The grid includes a checkbox adjacent to any debt category whose debt type is penalty or interest. All boxes are checked by default, but a user may unselect certain rows to customize the amount of detail shown. Clicking "calculate" causes the penalty and interest to be forecasted to the calculation date for the chosen obligation. Clicking the refresh P&I Details will redisplay the details after changing selections. The window 300 of FIG. 3 may be sufficient when a simple forecast of penalty and interest assessment values is desired. However, the window 300 does not provide calculation details that may be helpful in explaining to a taxpayer or other interested party how the penalty and interest assessment values were calculated.

Figure 4:
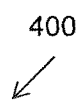
FIG. 4 illustrates an embodiment of a user display associated with penalty and interest assessment detail display.

FIG. 4 illustrates one embodiment of a penalty and interest detail window 400. The window displays a tree view of the details for the penalty and interest calculations. Penalty and interest assessments are called out separately. Each new penalty or interest assessment has a separate entry which indicates the data on which it was assessed. Penalty or interest entries may be expanded or collapsed by a user to provide a desired level of granularity. The entries also include pertinent information about calculation rules that are used when generating the assessment. This information is helpful to explain to a layperson how the assessment was calculated. As can be seen in FIG. 4, the details in the entries include calculation periods, calculation basis, rates, minimums and maximums. Of course other details may be included as appropriate.

The methods and systems described herein provide a forecast mode for penalty and interest calculation and the ability to invoke the penalty and interest assessment calculations for current or future dates. The capability for tracking data details from important steps in penalty and interest, as they are executed, is provided. A user interface is provided to display the penalty and interest calculation summary along with calculation details in human readable form. The user may filter, expand, and collapse the detail view.

Calculation details are determined and displayed in real time, rather than being stored in a database for future use. There are a large number of penalty and interest assessments, and the majority of assessments are paid by taxpayers without the need for verification. If the calculated detail were logged with every assessment, the amount of storage required and the impact to system performance would be unacceptable. By producing details only in real time when forecasting mode is selected, this impact on performance is greatly reduced.

Figure 5:
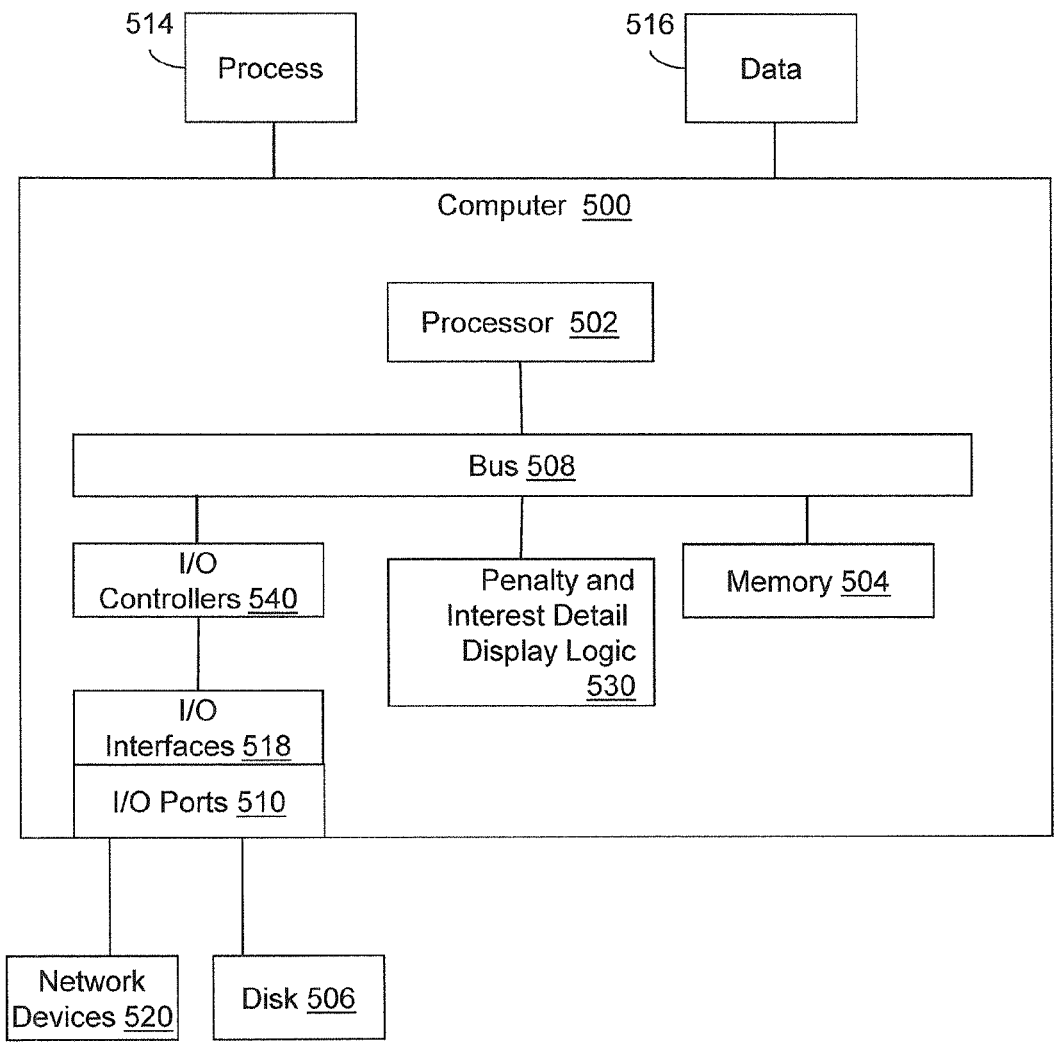
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a penalty and interest detail display logic 530 configured to facilitate displaying details of penalty and interest calculations. In different examples, the logic 530 may be implemented in hardware, a non-transitory computer-readable medium with stored instructions, firmware, and/or combinations thereof. While the penalty and interest detail display logic 530 is illustrated as a hardware component attached to the bus 508, it is to be appreciated that in one example, the penalty and interest detail display logic 530 could be implemented in the processor 502.

In one embodiment, the penalty and interest detail display logic 530 is a means (e.g., hardware, non-transitory computer-readable medium, firmware) for generating in real time and displaying penalty and interest calculation details.

The means may be implemented, for example, as an ASIC programmed to generating in real time and displaying penalty and interest calculation details. The means may also be implemented as stored computer executable instructions that are presented to computer 500 as data 516 that are temporarily stored in memory 504 and then executed by processor 502.

The penalty and interest detail display logic 530 may also provide means (e.g., hardware, non-transitory computer-readable medium that stores executable instructions, firmware) for receiving a request for a penalty and interest assessment value; determining if the request includes a request for calculation details; when the request includes a request for calculation details, calculating the penalty and interest assessment value using data received with the request; populating one or more calculation details is based on the calculation of the penalty and interest assessment; and displaying the calculated penalty and interest assessment value and the calculation details.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method of FIG. 2.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.

SQL: structured query language.
OQL: object query language.
USB: universal serial bus.
XML: extensible markup language.
WAN: wide area network.

"Computer component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer including a processor cause the computer to generate assessment values, the instructions comprising instructions for:

calculating, by the processor, a penalty and interest assessment value based, at least in part, on one or more debt categories;

storing, by the processor, the penalty and interest assessment value in a data store;

receiving, by the processor, a request for the penalty and interest assessment value and a calculation action parameter value, where the calculation action parameter value can be set to i) a standard forecast value or ii) a calculation details value;

wherein the computer comprises a plug-in that receives the calculation action parameter value as an input selection parameter;

determining, by the processor, the calculation action parameter value from the request and if the calculation action parameter value is determined by the processor to be set to the standard forecast value, the instructions cause the processor to:

retrieve the stored penalty and interest assessment value from the data store; and display the retrieved penalty and interest assessment value on a display connected to the computer;

if the calculation action parameter value is determined by the processor to be set to the calculation details value, the instructions cause the processor to:

build the penalty and interest assessment value without retrieving the stored penalty and interest assessment value from the data store, wherein the building includes re-calculating the penalty and interest assessment value based, at least in part, on the one or more debt categories using data received with the request;

populate one or more calculation details in data entry fields, where the calculation details include a set of line items that each i) correspond to a debt category and ii) show the effect of the debt category on the calculation of the penalty and interest assessment value; and display the calculated penalty and interest assessment value and the calculation details on the display connected to the computer;

wherein after the displaying, the instructions cause the processor to discard and not store the calculated penalty and interest assessment value and the calculation details in the data store causing the computer to conserve storage space in the data store and reduce operations performed by the computer.

2. The non-transitory computer-readable medium of claim 1 where the re-calculating is performed without retrieving a stored penalty and interest assessment value.

3. The non-transitory computer-readable medium of claim 1 where the calculation action parameter comprises an input selection to a plug-in that performs the penalty and interest assessment value calculation.

4. The non-transitory computer-readable medium of claim 1 where data received with the request comprises a calculation date based upon which the penalty and interest assessment value is to be calculated.

5. The non-transitory computer-readable medium of claim 1 where the calculation details include a log of individual penalty and interest assessments that result in the calculated penalty and interest assessment value.

6. The non-transitory computer-readable medium of claim 1 where the calculation details include a textual description of calculation rules that are relevant to the calculated penalty and interest assessment.

7. A computing system, comprising:
a processor connected to at least one memory;
a non-transitory computer readable medium connected to at least one data communication path with the processor and the at least one memory;
a penalty and interest transaction data store configured to store a penalty and interest assessment value;
an assessment request logic stored in the non-transitory computer readable medium including instructions executable by the processor to cause the processor to receive i) a request for the penalty and interest assessment value and ii) a calculation action parameter that can be set to i) a standard forecast value or ii) a calculation details value;
an assessment selection logic stored in the non-transitory computer readable medium including instructions executable by the processor to cause the processor to determine whether the calculation action parameter is set to the standard forecast value or the calculation details value, where the assessment selection logic comprises:
a penalty and interest retrieval logic configured to retrieve the penalty and interest assessment value from the penalty and interest data store when the calculation action parameter is set to the standard forecast value; and
a penalty and interest calculation logic configured to, when the calculation action parameter is set to the calculation details value:
calculate the penalty and interest assessment value based on one or more debt categories using data received as part of the request; and
populate one or more calculation details based on the calculation of the penalty and interest assessment, where the calculation details include a set of line items that each i) correspond to a debt category and ii) show the effect of the debt category on the calculation of the penalty and interest assessment value;

wherein the penalty and interest calculation logic comprises a plug-in that receives the value of the calculation action parameter as an input selection parameter; and a display logic stored in the non-transitory computer readable medium including instructions executable by the processor to cause the processor to display either: i) the penalty and interest assessment value retrieved from the data store by the penalty and interest retrieval logic or ii) the penalty and interest assessment and the calculation details calculated by the penalty and interest calculation logic;

wherein the penalty and interest calculation logic further includes stored instructions that when executed by the processor cause the processor to:
discard the calculated penalty and interest assessment value and the calculation details after the calculated penalty and interest assessment value and the calculation details are displayed without storing the calculated penalty and interest assessment value or the calculation details in the data store causing the computer to conserve storage space in the data store and reduce operations performed by the computer.

8. The computing system of claim 7 where the penalty and interest calculation logic is configured to calculate the penalty and interest assessment without retrieving a stored penalty and interest assessment value when the calculation action parameter is set to the standard forecast value.

9. The computing system of claim 7 where the penalty and interest calculation logic is configured to calculate the penalty and interest assessment value using an input calculation date on which a penalty and interest assessment value is to be calculated.

10. The computing system of claim 7 where the penalty and interest calculation logic is configured to generate a log of individual penalty and interest assessments that result in the calculated penalty and interest assessment.

11. The computing system of claim 7 where the penalty and interest calculation logic is configured to include a textual description of calculation rules that are relevant to the calculated penalty and interest assessment in the calculation details.

12. A computer-implemented method, comprising:
calculating, by a processor of a computer, a penalty and interest assessment value based, at least in part, on one or more debt categories;
storing, by the processor, the penalty and interest assessment value in a data store in data communication with the processor;
receiving, by the processor, a request for the penalty and interest assessment value and a calculation action parameter value, where the calculation action parameter can be set to i) a standard forecast value or ii) calculation details value;
wherein the calculation action parameter value comprises an input selection to a plug-in that performs the calculation of the penalty and interest assessment value with the processor;
determining, by the processor, the calculation action parameter value from the request and
if the calculation action parameter value is set to the standard forecast value:

retrieving, by the processor, the stored penalty and interest assessment value from the data store; and displaying, by the processor, the retrieved penalty and interest assessment value on a display connected to the computer;

if the calculation action parameter value is set to the calculation details value:

re-calculating, by the processor, the penalty and interest assessment value based, at least in part, on the one or more debt categories using data received with the request;

populating, by the processor, one or more calculation details, where the calculation details include a set of line items that each i) correspond to a debt category and ii) show the effect of the debt category on the calculation of the penalty and interest assessment value; and displaying the calculated penalty and interest assessment value and the calculation details;

wherein after the displaying, the processor is controlled to discard and not store the calculated penalty and interest assessment value and the calculation details in the data store causing the computer to conserve storage space in the data store and reducing operations performed by the computer.

13. The computer-implemented method of claim 12 where the calculating is performed without retrieving a stored penalty and interest assessment value.

14. The computer-implemented method of claim 12 where the data received with the request comprises a calculation date based upon which the penalty and interest assessment value is to be calculated.

15. The computer-implemented method of claim 12 where the calculation details include a log of individual penalty and interest assessments that result in the calculated penalty and interest assessment value.

16. The computer-implemented method of claim 12 the calculation details include a textual description of calculation rules that are relevant to the calculated penalty and interest assessment.

* * * * *